United States Patent
Zhao et al.

(10) Patent No.: US 11,762,758 B2
(45) Date of Patent: Sep. 19, 2023

(54) SOURCE CODE FAULT DETECTION

(71) Applicant: International Business Machines Corporation, Armonk, NY (US)

(72) Inventors: Shiwan Zhao, Beijing (CN); Bo Yang, Beijing (CN); HongLei Guo, Beijing (CN); Zhong Su, Beijing (CN); Yunhui Zheng, Chappaqua, NY (US); Jim Alain Laredo, Katonah, NY (US); Alessandro Morari, New York, NY (US); Marco Pistoia, Amawalk, NY (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 17/215,341

(22) Filed: Mar. 29, 2021

(65) Prior Publication Data

US 2022/0308984 A1    Sep. 29, 2022

(51) Int. Cl.
*G06F 8/71*  (2018.01)
*G06F 8/40*  (2018.01)
*G06F 8/41*  (2018.01)
*G06F 11/36* (2006.01)
*G06N 3/04*  (2023.01)
(Continued)

(52) U.S. Cl.
CPC ........... *G06F 11/3624* (2013.01); *G06N 3/04* (2013.01); *G06N 3/08* (2013.01); *G06F 11/3608* (2013.01);
(Continued)

(58) Field of Classification Search
CPC .. G06F 11/3624; G06F 21/577; G06F 21/563; G06F 8/40; G06F 11/3608;
(Continued)

(56) References Cited

U.S. PATENT DOCUMENTS

2019/0018967 A1   1/2019 Ramasamy
2019/0227902 A1*  7/2019 Cheng ................. G06F 8/71
(Continued)

FOREIGN PATENT DOCUMENTS

CN        103679030 B      3/2014

OTHER PUBLICATIONS

Hoa Khanh Dam et al., A deep tree-based model for software defect prediction, Feb. 3, 2018 , [Retrieved on May 13, 2023]. Retrieved from the internet: <URL: https://arxiv.org/pdf/1802.00921.pdf> 10 Pages (1427-1434) (Year: 2018).*

(Continued)

*Primary Examiner* — Anibal Rivera
(74) *Attorney, Agent, or Firm* — Stephen R. Yoder

(57) ABSTRACT

Approaches presented herein enable fault detection. More specifically, implementation code of one or more functions is identified from source code. The implementation code of the one or more functions is converted to corresponding Abstract Syntax Trees (ASTs). The implementation code of the one or more functions is represented as a first plurality of sets of AST paths over the ASTs. Classification results for the one or more functions are generated with a classifier based on the first plurality of sets of AST paths for the implementation code of the one or more functions. Each of the classification results indicates a probability of having at least one fault in a corresponding function of the one or more functions. Fault detection results of the source code are generated based on the classification results.

20 Claims, 10 Drawing Sheets

(51) Int. Cl.
*G06N 3/08* (2023.01)
*G06F 21/57* (2013.01)
*G06F 21/56* (2013.01)
*G06N 20/00* (2019.01)

(52) U.S. Cl.
CPC ........ *G06F 11/3616* (2013.01); *G06F 21/563* (2013.01); *G06F 21/577* (2013.01); *G06F 2221/033* (2013.01); *G06N 20/00* (2019.01)

(58) Field of Classification Search
CPC ........ G06F 11/3616; G06F 8/71; G06F 8/443; G06F 8/73; G06F 8/36; G06F 8/75; G06N 20/00
See application file for complete search history.

(56) References Cited

U.S. PATENT DOCUMENTS

2020/0073784 A1* 3/2020 Cheng ................. G06F 11/3616
2020/0319878 A1* 10/2020 Makkar .................... G06F 8/36
2022/0129261 A1* 4/2022 Cabrera Lozoya ....... G06F 8/40
2022/0292200 A1* 9/2022 Zou ...................... G06F 18/214

OTHER PUBLICATIONS

Alon et al., "CODE2SEQ: Generating Sequences From Structured Representations of Code", Published as a conference paper at ICLR 2019, 22 pages.

Medeiros et al., "Automatic Detection and Correction of Web Application Vulnerabilities using Data Mining to Predict False Positives", IW3C2, WWW'14, Apr. 7-11, 2014, <https://www.di.fc.ul.pt/~nuno/PAPERS/WWW14.pdf>, 11pages.

Mell et al., "The NIST Definition of Cloud Computing", NIST, National Institute of Standards and Technology, Special Publication 800-145, Sep. 2011, 7 pages.

Wang et al., "Staged Method of Code Similarity Analysis for Firmware Vulnerability Detection", IEEE, vol. 7, 2019, <https://ieeexplore.ieee.org/stamp/stamp.jsp?arnumber=8616839>, 15 pages.

* cited by examiner

```
Example function C:
1   int count (String str, char ch) {
2     int a= 0;
3     int b =-1;
4     do {
5         index= str.indexOf(ch, index + 1);
6         if (b >= 0) {
7         a++;}
8     } while (b >= 0);
9        return a;
10 }
```

FIG. 6a

```
Example Parent Commit 1:
1   public static int levelOfNumbering (string
2       numbering) {
3           system.out.println (numbering);
4       return numbering.split("\\.").length;
5   }
```

```
Example Child Commit 2:
1   public static int levelOfNumbering (string
2       numbering) {
3           if (numbering==null)
4               return 0;
5       return numbering.split("\\.").length;
6   }
```

FIG. 9

SOURCE CODE FAULT DETECTION

TECHNICAL FIELD

The present disclosure relates generally to software quality assurance and, more specifically, to fault detection for source code.

BACKGROUND

Fault detection can be a challenging issue in developing computer programs and software. The term "fault" refers to a specific flaw or an oversight in a piece of software that potentially could cause improper functionality, or present a vulnerability that might allow an attacker to gain unauthorized access to, or perform unauthorized actions, on a computer system or network. Some vulnerabilities include: Buffer Overflow (BoF), Format String Bug (FSB), Structured Query Language (SQL) injection, Cross Site Scripting (XSS), Cross Site Request Forgery (CSRF), etc.

SUMMARY

Approaches presented herein provide methods, systems, and computer program products for fault detection. According to an embodiment of the present disclosure, implementation code of one or more functions is identified from source code. The implementation code of the one or more functions is converted to corresponding Abstract Syntax Trees (ASTs). The implementation code of the one or more functions is represented as a first plurality of sets of AST paths over the ASTs. Classification results for the one or more functions are generated with a classifier based on the first plurality of sets of AST paths for the implementation code of the one or more functions. Each of the classification results indicates a probability of having at least one fault in a corresponding function of the one or more functions. Fault detection results of the source code are generated based on the classification results.

One aspect of the present invention includes a computer-implemented method for fault detection, comprising: identifying, by one or more processors, implementation code of one or more functions from source code, converting, by one or more processors, the implementation code of the one or more functions to corresponding Abstract Syntax Trees (ASTs), representing, by one or more processors, the implementation code of the one or more functions as a first plurality of sets of AST paths over the ASTs, generating, by one or more processors, classification results for the one or more functions with a classifier based on the first plurality of sets of AST paths for the implementation code of the one or more functions, each of the classification results indicating a probability of having at least one fault in a corresponding function of the one or more functions, and generating, by one or more processors, a fault detection result of the source code based on the classification results.

Another aspect of the present invention includes a computer-implemented system for fault detection, comprising: one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising: identifying implementation code of one or more functions from source code, converting the implementation code of the one or more functions to corresponding Abstract Syntax Trees (ASTs), representing the implementation code of the one or more functions as a first plurality of sets of AST paths over the ASTs, generating classification results for the one or more functions with a classifier based on the first plurality of sets of AST paths for the implementation code of the one or more functions, each of the classification results indicating a probability of having at least one fault in a corresponding function of the one or more functions, and generating a fault detection result of the source code based on the classification results.

Yet another aspect of the present invention includes a computer program product comprising one or more computer-readable tangible storage media and program instructions stored on at least one of the one or more computer-readable tangible storage media, the program instructions executable by a processor to cause the processor to perform a method comprising: converting the implementation code of the one or more functions to corresponding Abstract Syntax Trees (ASTs), representing the implementation code of the one or more functions as a plurality of sets of AST paths over the ASTs, generating classification results for the one or more functions with a classifier based on the plurality of sets of AST paths for the implementation code of the one or more functions, each of the classification results indicating a probability of having at least one fault in a corresponding function of the one or more functions, and generating a fault detection result of the source code based on the classification results.

Still yet, any of the components of the present invention could be deployed, managed, serviced, etc., by a service provider who offers to implement fault detection in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which:

FIG. 6a depicts an example implementation of a function according to an embodiment of the present disclosure.

FIG. 9 depicts an example parent commit 1 and an example child commit 2 according to an embodiment of the present disclosure.

Figure 1:
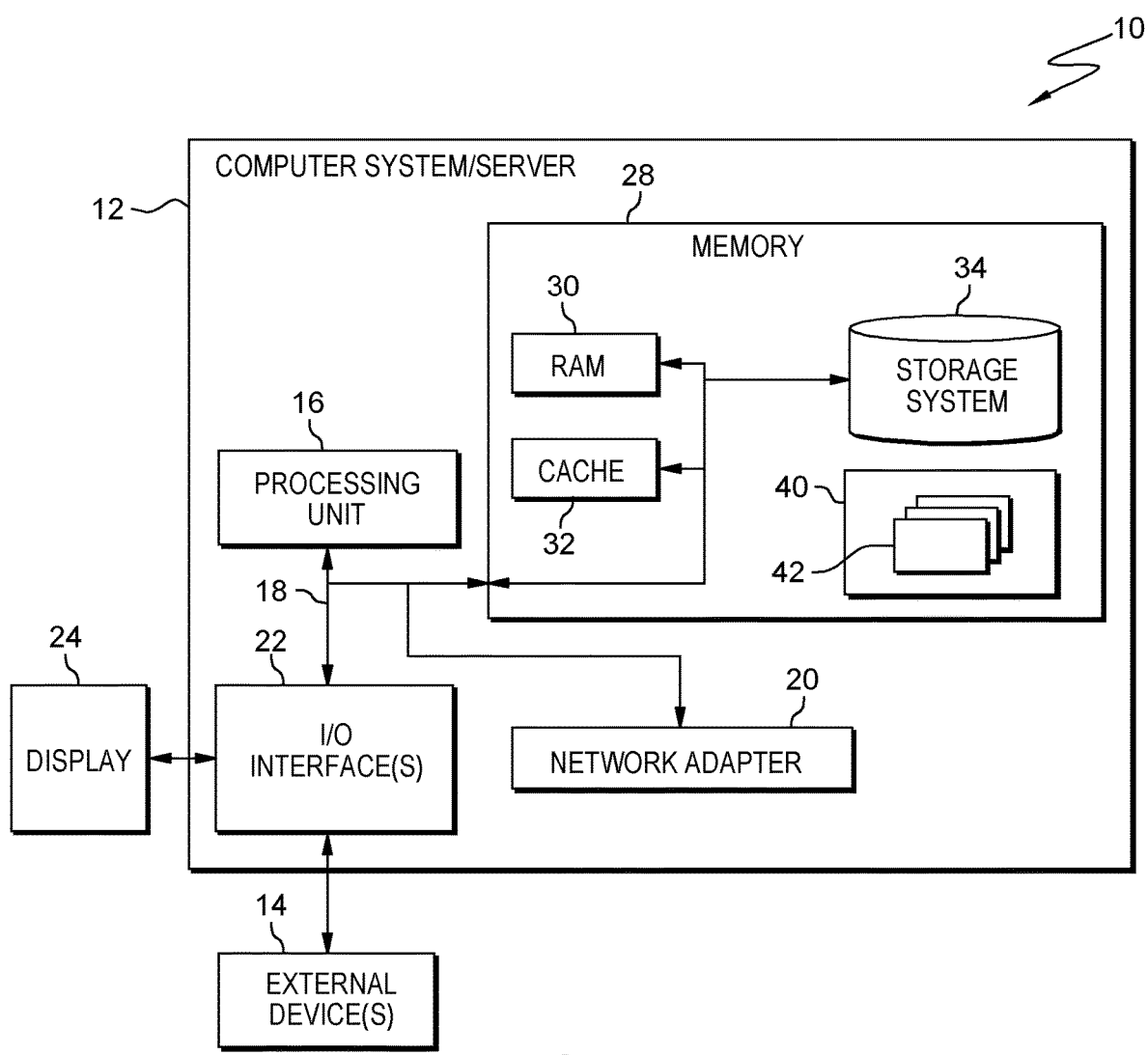
FIG. 1 depicts a cloud computing node according to an embodiment of the present disclosure.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor or processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
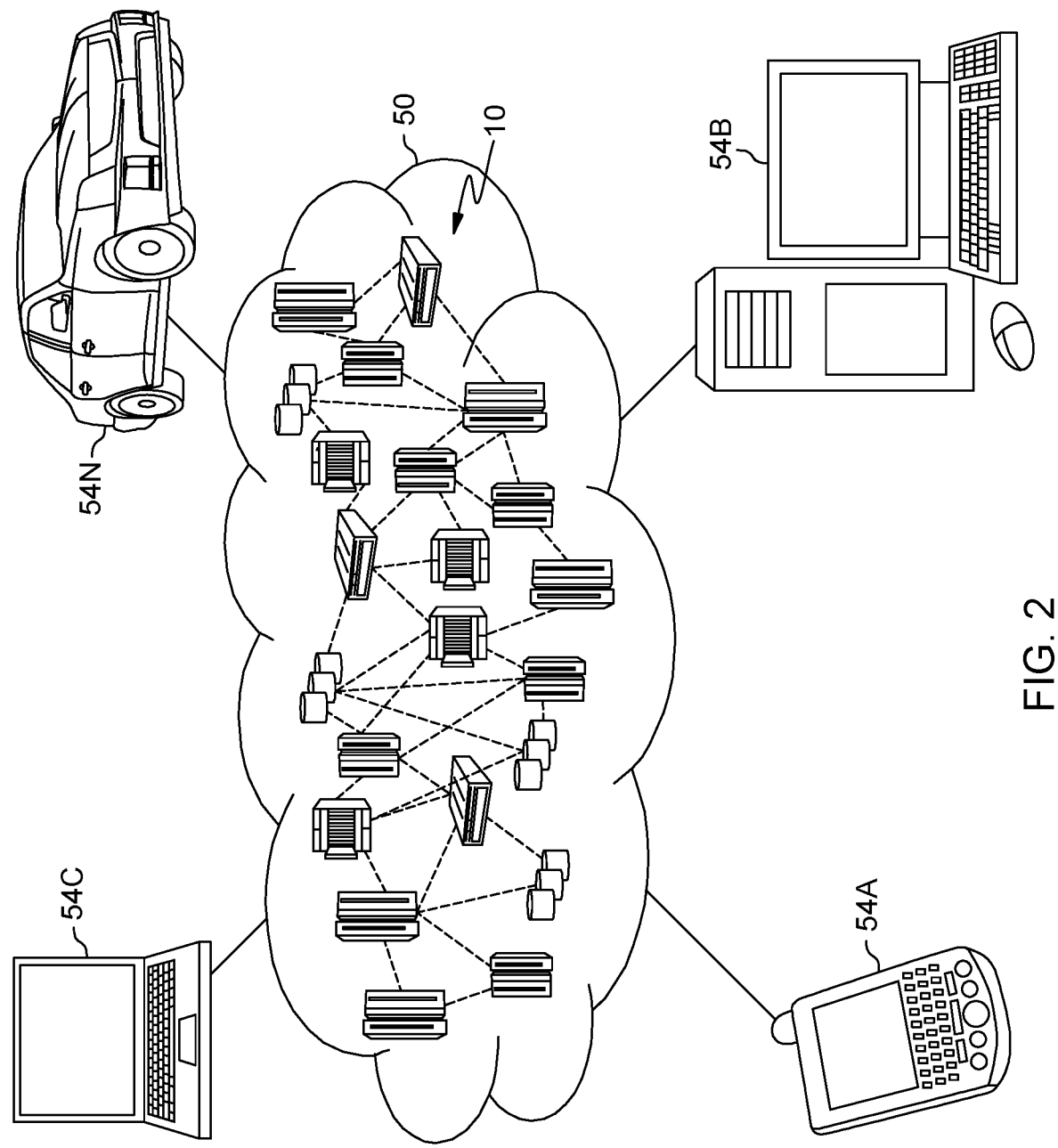
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
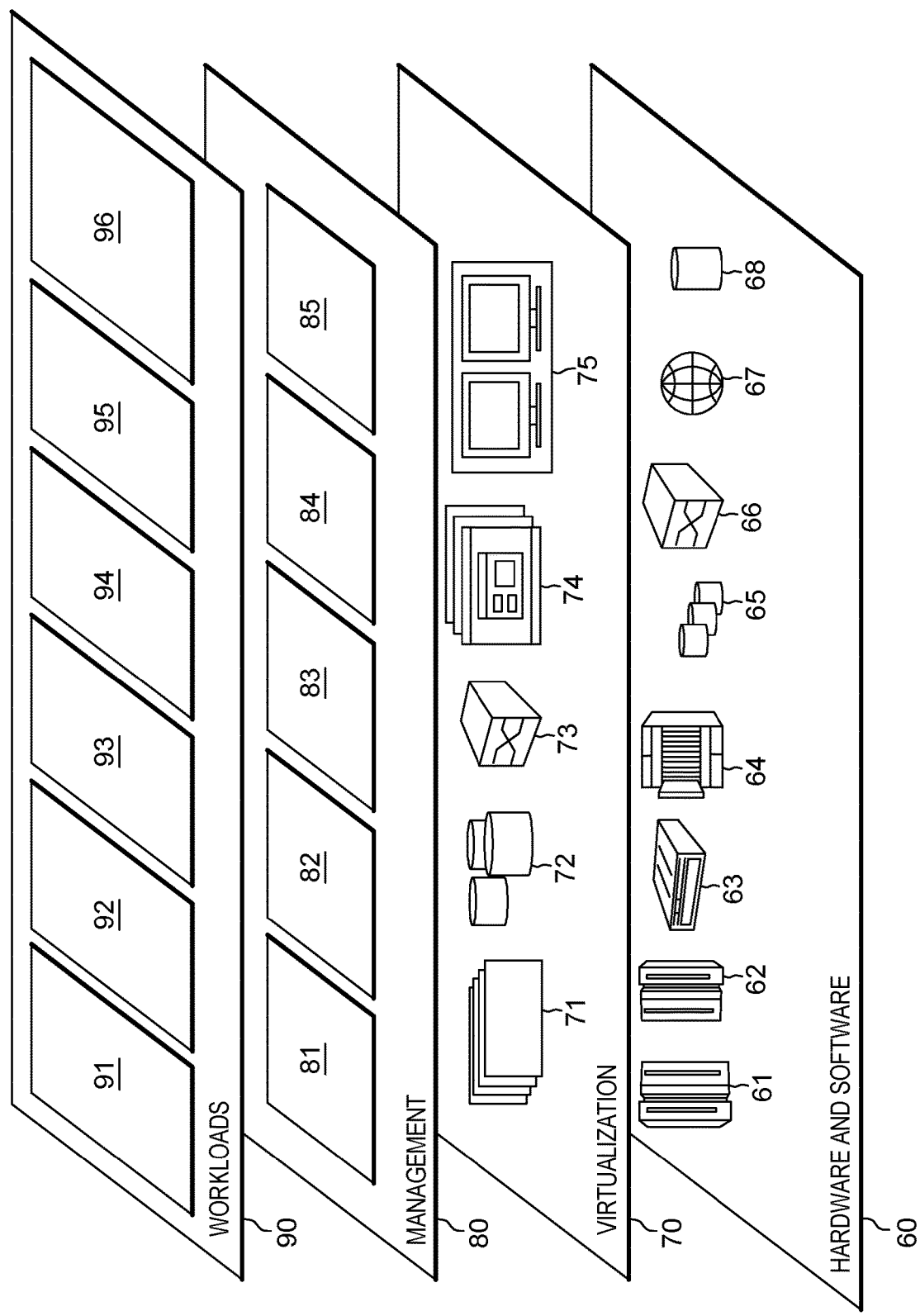
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and fault detection 96.

It should be noted that the fault detection method according to embodiments of this disclosure could be implemented by computer system/server 12 of FIG. 1.

The fundamental concepts regarding fault detection of present disclosure are introduced herein.

Source code: Source code is the list of human-readable instructions that a programmer writes with a certain programming language when he is developing a program. The source code is turned into machine code through a compiler, also called object code, that a computer can understand and execute.

Function: A function is a block of organized, reusable code that is used to perform a single, related action. Different programming languages name the function differently, for example, functions, methods, sub-routines, procedures, etc.

Implementation code of a function: Implementation code of a function refers to a code snippet written in a certain programming language which can implement the function.

Source code faults can present a wide variety of issues, ranging from improper functioning of computer software and systems to security vulnerabilities which may be exploited by those acting with malicious intent.

Static fault analysis (SFA) is an existing fault detection method that takes place very early in the software development life cycle as it does not require a working application and can be performed without executing code. SFA can help developers identify faults in initial stages of source code development and quickly resolve issues without breaking builds or passing on faults to the final release of the application. However, rule-based SFA tools are time consuming to use with high false positives and need expertise knowledge. Therefore, it is desired to improve the performance of SFA with less false positives.

In order to at least partially solve the above and other potential problems, embodiments of the present disclosure provide a new static fault analysis methodology by leveraging existing fault code store to construct a classifier for static fault analysis and detection. A plurality of commit pairs comprising parent commits and child commits can be obtained from the existing fault code store. A large amount of implementation code of sample functions can be retrieved from the plurality of commit pairs. The implementation code of the plurality of sample functions includes implementation code of a plurality of sample function pairs. Each of the plurality of sample function pairs includes implementation code of a sample function from a parent commit with at least one fault and implementation code of a sample function from a child commit with the at least one fault fixed. Implementation code of these sample function pair can be converted to vector representations as training data for constructing the classifier for static fault analysis and detection. The static fault analysis methodology of the present disclosure can implement static fault analysis and detection for source code in a more cost-effective way with less false positives.

Figure 4:
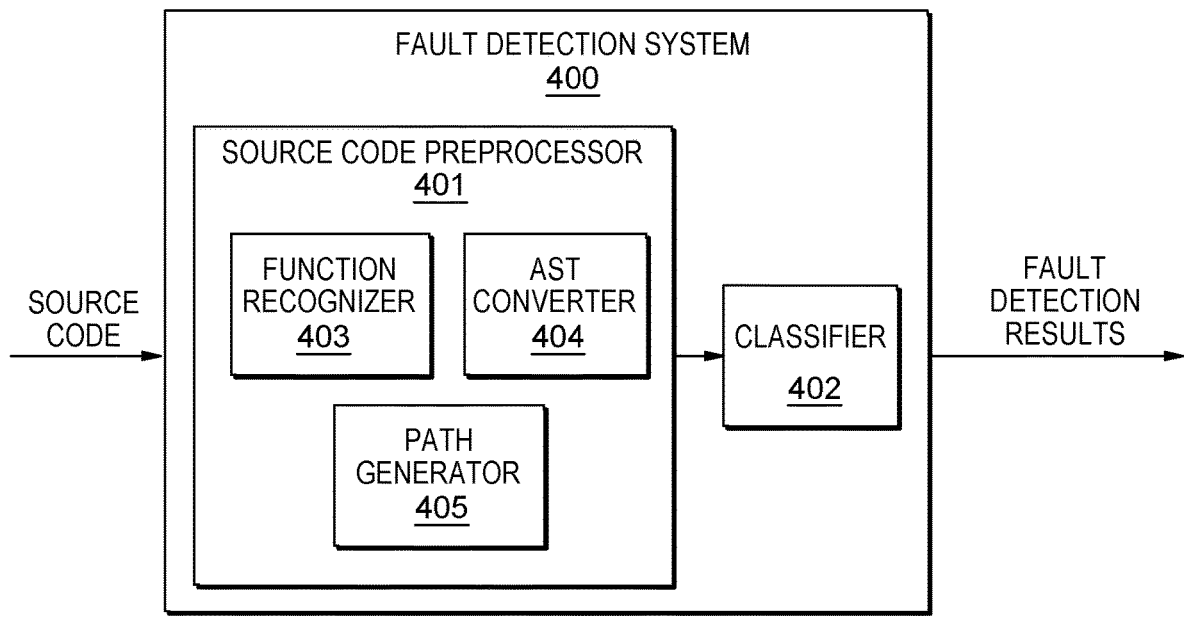
FIG. 4 depicts an example fault detection system according to an embodiment of the present disclosure.

With reference now to FIG. 4, an example fault detection system 400 according to an embodiment of the present disclosure is depicted. Fault detection system 400 can receive source code and output a fault detection result of the source code. The fault detection result can indicate whether there is at least one fault in the source code. Fault detection system 400 includes source code preprocessor 401 and classifier 402. Source code preprocessor 401 can convert the received source code to a group sets of Abstract Syntax Trees (ASTs) paths. After receiving the group sets of AST paths, classifier 402 can generate the fault detection result of the source code. Specifically, source code preprocessor 401 includes function recognizer 403, AST convertor 404 and path generator 405. Function recognizer 403 can identify implementation code of one or more functions from the received source code. Herein, implementation code of one or more functions is a part of the received source code. AST convertor 404 can convert the implementation code of the one or more functions into corresponding Abstract Syntax Trees (ASTs). Path generator 405 can represent an implementation of each of the one or more functions as a set of AST paths over the ASTs.

Figure 5:
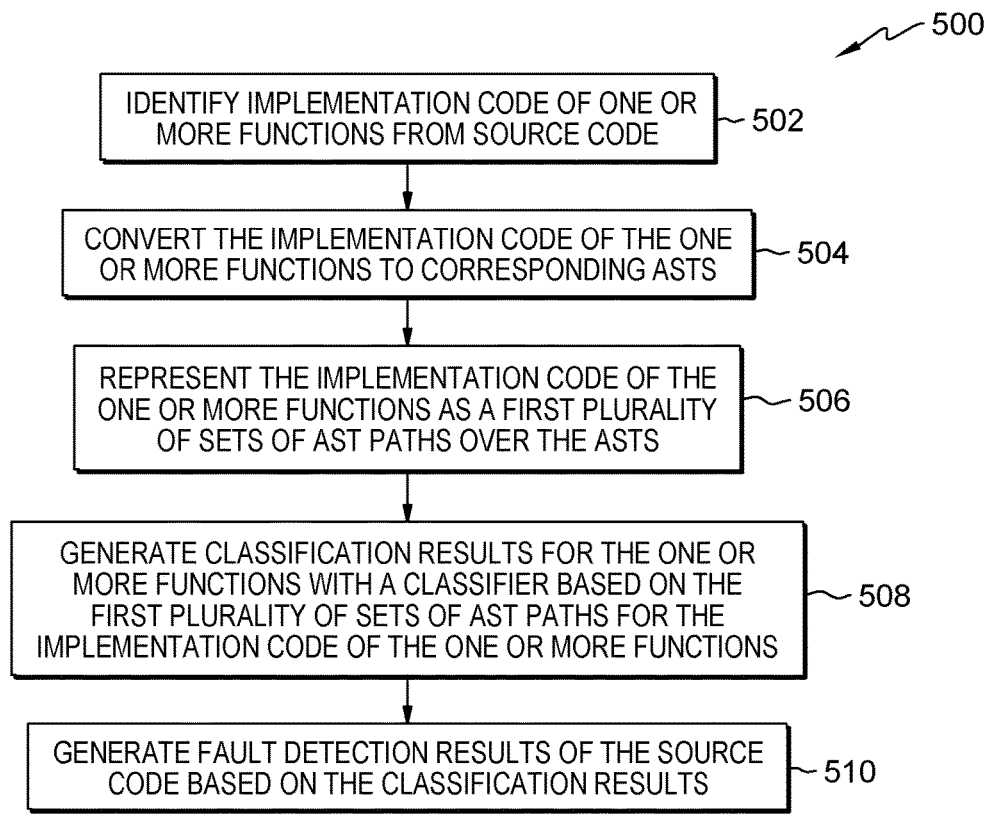
FIG. 5 depicts an example fault detection method according to an embodiment of the present disclosure.

With reference now to FIG. 5, an example fault detection method according to an embodiment of the present disclosure is depicted. The method 500 can be implemented by fault detection system 400. The method 500 comprises steps S502-S510.

At S502, after receiving source code, function recognizer 403 can identify implementation code of one or more functions from the source code. The implementation code of the one or more functions include one or more code snippets implementing the one or more functions. Function recognizer 501 can use any existing function identifying method such as static code analysis tool to identify implementation code of one or more functions from the source code.

At S504, AST convertor 404 can convert the implementation code of the one or more functions to corresponding Abstract Syntax Trees (ASTs). Abstract syntax trees are data structures widely used in compilers to represent the structure of program code. An AST is usually a result of the syntax analysis phase of a compiler. The AST often serves as an intermediate representation of the program code in several stages that the compiler requires and has a strong impact on the final output of the compiler. An Abstract Syntax Tree (AST) uniquely represents a source code snippet in a given language and grammar. The leaves of the AST are called terminals, and usually refer to user-defined values which represent identifiers and names from the code. The non-leaf nodes are called non-terminals and represent a restricted set of structures in the program language, e.g., loops, expressions, and variable declarations.

Figure 6B:
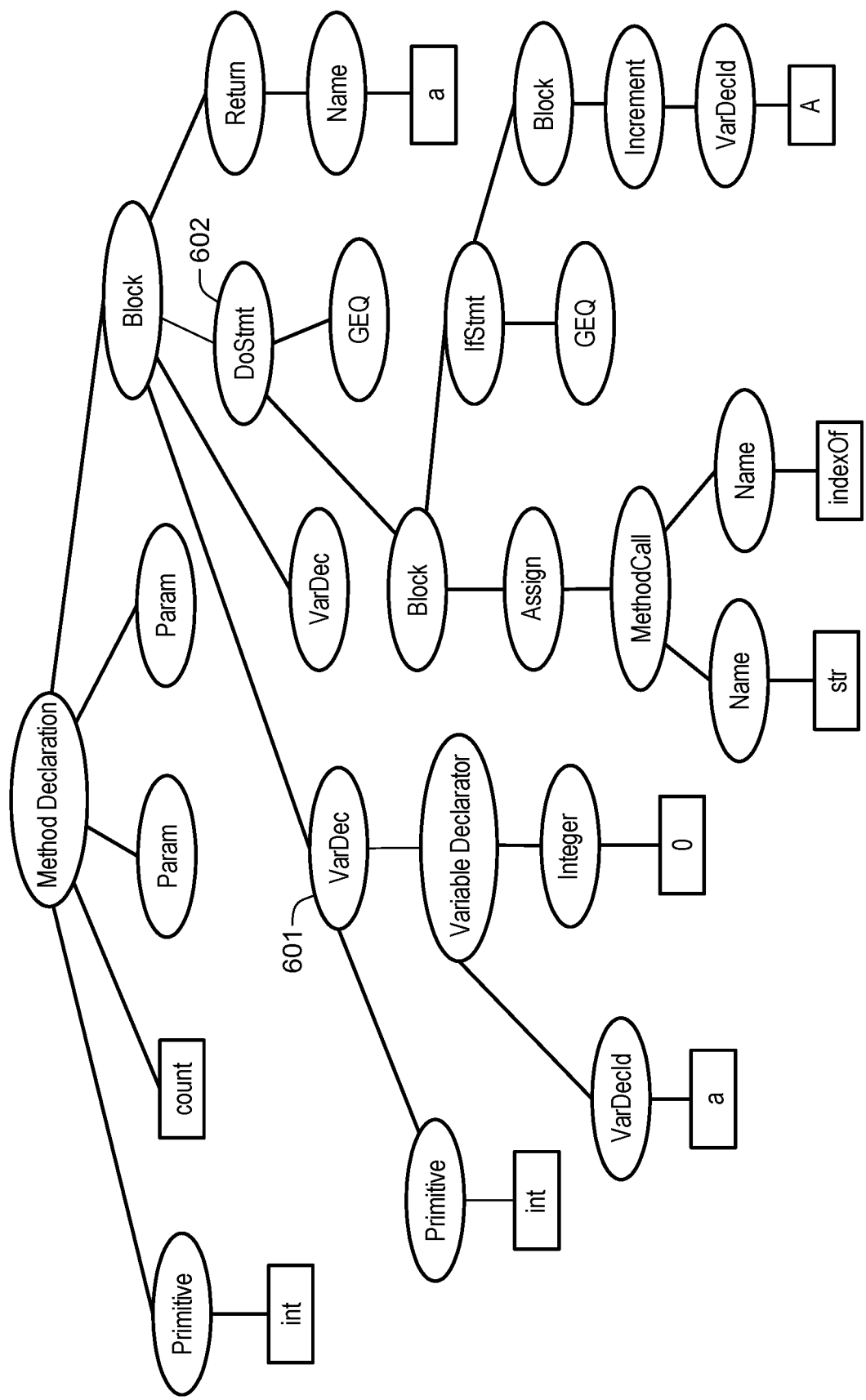
FIG. 6b depicts a partial Abstract Syntax Tree (AST) for the example implementation of the function shown in FIG. 6a according to an embodiment of the present disclosure.

With reference now to FIG. 6a and FIG. 6b, an example implementation code of example function C is depicted in FIG. 6a and a partial AST for the example implementation code of the function of FIG. 6a is depicted in FIG. 6b according to an embodiment of the present disclosure. By way of example, Names (such as variables a and b in Lines 2,3 in FIG. 6a) and types (such as "int" in Lines 2,3 in FIG. 6a) are represented as values of terminals in FIG. 6b. Syntactic structures such as variable declaration in Lines 2,3 in FIG. 6a and a do-while loop in Lines 4-8 in FIG. 6a are represented as non-terminals VarDec 601 and DoStmt 602 in FIG. 6b. According to embodiments, AST convertor 502 can be implemented by existing compilers which can convert the identified implementation code of the one or more functions to corresponding ASTs.

At S506, path generator 405 can represent the implementation code of the one or more functions as a plurality of sets of AST paths over the ASTs. Taking the AST of implementation code of example function C in FIG. 6a as an example, all pairwise paths between terminals and their terminals' values can be used to represent the implementation code of example function C itself. Each pair of terminals $(v_1^i, v_{l_i}^i)$ in the AST implies a single path between two of them: $v_1^i v_2^i \ldots v_{l_i}^i$. The implementation code of example function C can be represented as a set of AST paths: $\{x_1, \ldots, x_j\}$, wherein each path is represented as $x_i = v_1^i v_2^i \ldots v_{l_i}^i$, and $l_i$ is the length of the ith path. That is, the implementation code of example function C can be represented as a set of AST path: $\{(v_1^i v_2^i \ldots v_{l_i}^i), \ldots, v_1^k v_2^k \ldots v_{l_k}^k)\}$.

At S508, classifier 402 can generate classification results for the one or more functions each indicating a probability of having at least one fault in the one or more functions based on the plurality of sets of AST paths for the implementation code of the one or more functions. Classifier 402 can be constructed based on at least part of a plurality of sets of AST paths for implementation code of a plurality of sample functions and corresponding labels thereof each indicating whether there is at least one fault in implementation code of corresponding sample function of the plurality of sample functions. Classifier 402 can provide a mapping between a set of ASTs paths for implementation code of a function and a classification result indicating a probability of having at least one fault in the function.

According to embodiments, the implementation code of the plurality of sample functions include implementation code of a plurality of sample function pairs each including implementation code of a first sample function from a parent commit with at least one fault and implementation code of a second sample function from a child commit with the at least one fault fixed. The parent commit and the child commit are obtained from existing fault code store.

Figure 7:
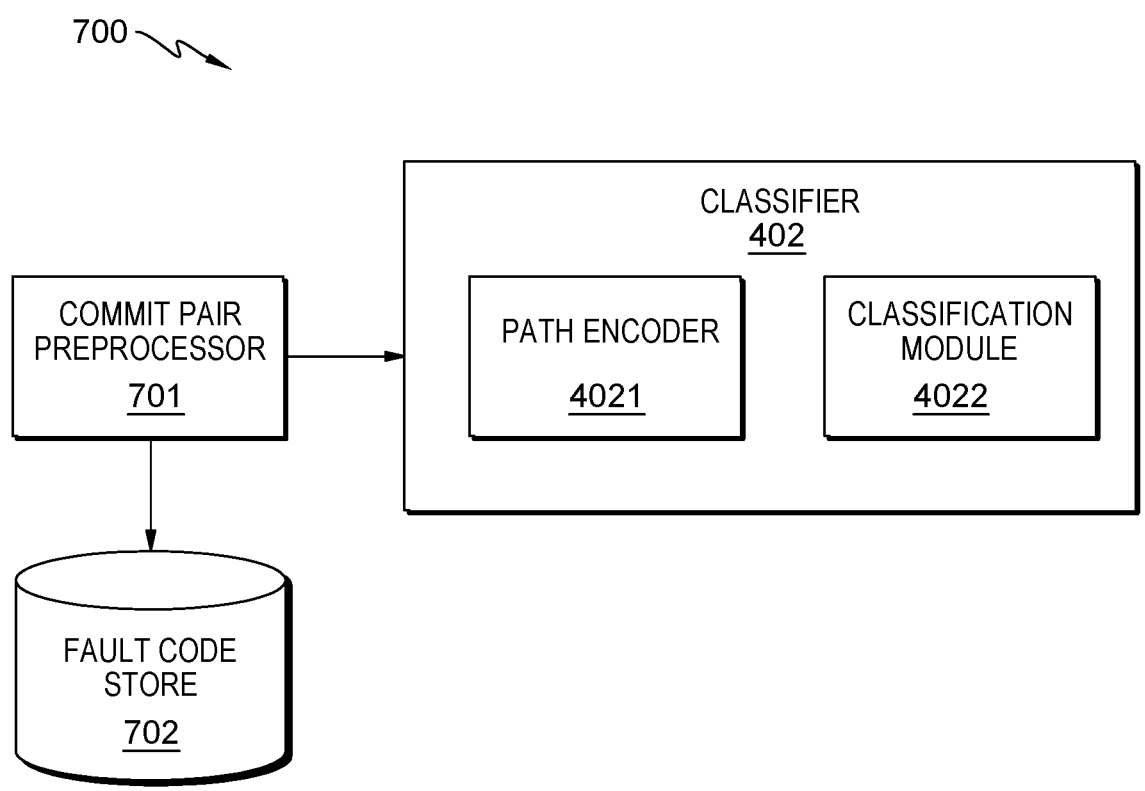
FIG. 7 depicts an example system for constructing a classifier for fault detection according to an embodiment of the present disclosure.

With reference now to FIG. 7, an example system 700 for constructing classifier 402 for fault detection according to an embodiment of the present disclosure is depicted. System 700 includes commit pair preprocessor 701, fault code store 702 and classifier 402. Commit pair preprocessor 701 can implement preprocessing of commit pairs each comprising a parent commit and a child commit acquired from fault code store 702. Classifier 402 includes path encoder 4021 and classification module 4022.

Figure 8:
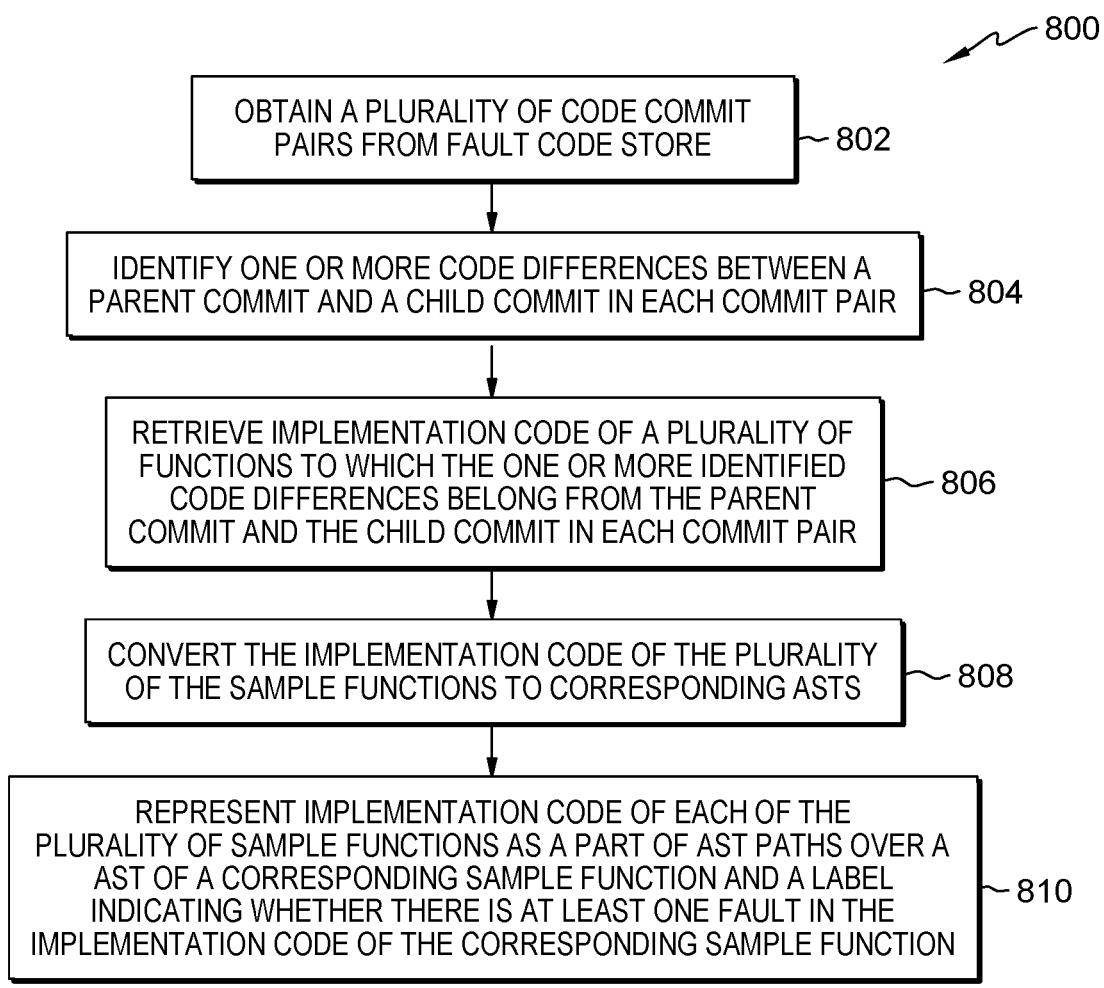
FIG. 8 depicts an example method for preprocessing commit pairs according to an embodiment of the present disclosure.

With reference now to FIG. 8, an example method 800 for preprocessing commit pairs according to embodiments of the present disclosure is depicted. The method 800 can be implemented by system 700. The method 800 comprises steps S802-S810.

At S802, commit pair preprocessor 701 can obtain a plurality of commit pairs from fault code store 702. Each of the plurality of commit pairs includes a parent commit and a child commit with parent-child relationship in a commit tree. The parent commit includes at least one fault and the child commit includes the at least one fault fixed. Fault code store 702 can be existing fault code database for example, but not limited to, a GitHub projects, Linux, Kubernetes, and the like.

According to embodiments, commit pair preprocessor 701 can identify a plurality of child commits based on code comments related to fixing faults in fault code store 702. Then commit pair preprocessor 701 can acquire unique identifications (UIDs) of the plurality of child commits from fault code store 702. Commit pair preprocessor 701 can further locate the plurality of parent commits from commit trees in fault code store 702 using the UIDs of the plurality of child commits. As known in the art, a commit tree describes a relationship between commits. Each commit is a node of the commit tree. The parent commit and the child commit in each code commit pair are two nodes with parent-child relationship in the commit tree. In this way, commit pair preprocessor 701 can retrieve respective parent commits of the plurality of child commits from commit trees, i.e. parent commits and corresponding child commits in the plurality of commit pairs.

At S804, commit pair preprocessor 701 can identify one or more code differences between a parent commit and a child commit in each commit pair. The one or more code differences may include one or more negative code lines in the parent commit and one or more positive code lines in the child commit. By comparing the parent commit and a child commit in each commit pair, commit pair preprocessor 701 can identify one or more code differences between the parent commit and the child commit.

With reference now to FIG. 9, an example parent commit 1 and an example child commit 2 are depicted respectively according to an embodiment of the present disclosure. By comparing the example parent commit 1 and the example child commit 2, it can be determined that Line 3 in the example parent commit 1 is deleted and Lines 3 and 4 in the example child commit 2 are newly added. Line 3 in the example parent commit 1 and Lines 3 and 4 in the example child commit 2 can be identified as code differences between the example parent commit 1 and the example child commit 2. In particular, Line 3 in the example parent commit 1 can be identified as a negative code line which is deleted in the example child commit 2, and Lines 3 and 4 in the example child commit 2 can be identified as positive code lines which are newly added in the example child commit 2.

At S806, commit pair preprocessor 701 can retrieve implementation code of a plurality of functions to which the one or more identified code differences belong from the parent commits and the child commits in the plurality of commit pairs. The retrieved plurality of functions can be used as sample functions for processing by commit pair preprocessor 701. The implementation code of the plurality of sample functions include a plurality of sample function pairs each including implementation code of a first sample function from a parent commit with at least one fault and implementation code of a second sample function from a child commit with the at least one fault fixed. By way of example, the implementation code of function levelOfNumbering can be retrieved from the example parent commit 1 using Line 3 in the example parent commit 1. The implementation code of function levelOfNumbering can be retrieved from example child commit 2 using Lines 3 and 4 in the example child commit 2.

Figure 10A:
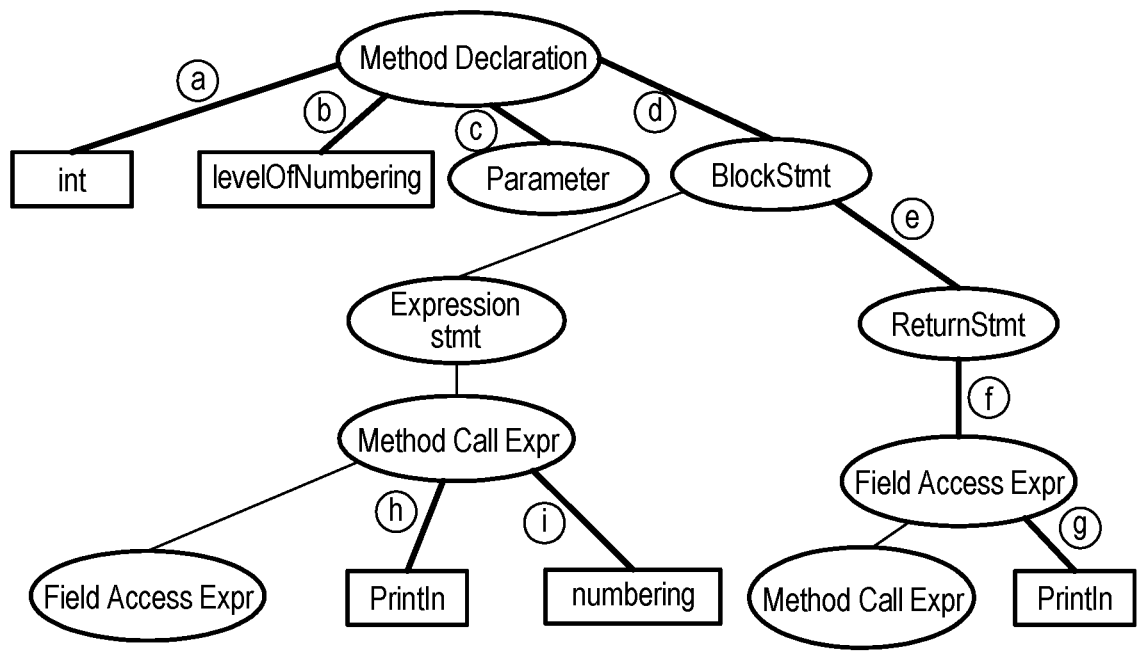
FIG. 10a depicts an AST of function levelOfNumbering in the example parent commit 1 shown in FIG. 9 according to an embodiment of the present disclosure.
Figure 10B:
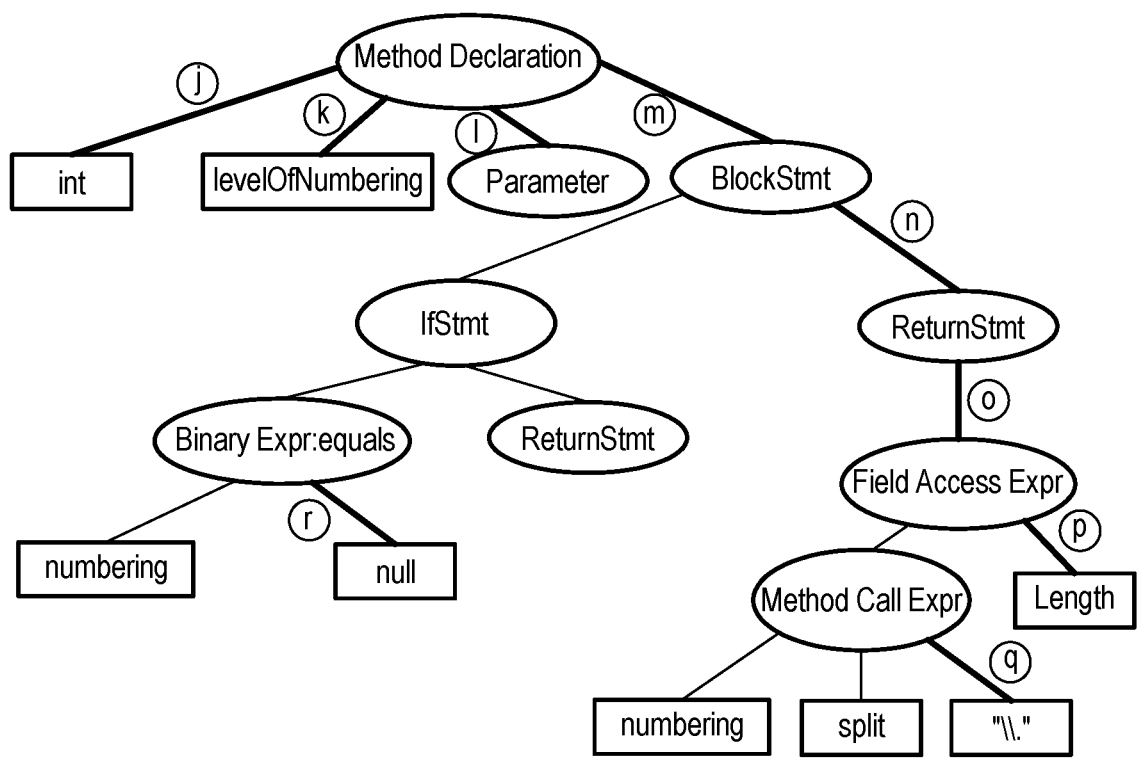
FIG. 10b depicts an AST of function levelOfNumbering in the example child commit 2 shown in FIG. 9 according to an embodiment of the present disclosure.

At S808, commit pair preprocessor 701 can convert the implementation code of the plurality of sample functions to a plurality of Abstract Syntax Trees (ASTs). With reference to the implementation method depicted in S504, the implementation code of the plurality of sample functions can be converted to the plurality of ASTs. By way of example, FIG. 10a depicts an AST of function levelOfNumbering in the example parent commit 1 of FIG. 9 according to an embodiment of the present disclosure. FIG. 10b depicts an AST of function levelOfNumbering in the example child commit 2 of FIG. 9 according to an embodiment of the present disclosure.

At S810, commit pair preprocessor 701 can represent the implementation code of each of the plurality of sample functions as at least part of AST paths over a AST of a corresponding sample function and a label indicating whether there is at least one fault in the implementation code of the corresponding sample function. The at least part of AST paths over the AST of the corresponding sample function includes one or more code differences included in the implementation code of the corresponding sample function. With reference to S506 above, given an AST of implementation code of a function, all pairwise paths between terminals and their terminals' values can be obtained. As shown in FIG. 10a, AST paths a, b, c, d, e, f, g, h, i which include code differences between the example parent commit 1 and the example child commit 2 can be identified from all paths over the AST of function levelOfNumbering in the example parent commit 1 of FIG. 9. As shown in FIG. 10b, AST paths j, k, l, m, n, o, p, q, r which include code differences between the example parent commit 1 and the example child commit 2 can be identified from all paths over the AST of function levelOfNumbering in the example child commit 2 of FIG. 9.

According to embodiments, for a sample function pair comprising implementation code of a first sample function from a parent commit with at least one fault and implementation code of a second sample function from a child commit with the at least one fault fixed, the implementation code of the first sample function can be represented as at least part of AST paths indicated as $\{x_1, \ldots, x_i\}$ over an AST of the first sample function and a label indicating there is at least one fault in the implementation code of the first sample function, wherein each AST path can be represented as and $x_i = v_1^i v_2^k \ldots v_{l_i}^i$ and $l_i$ is the length of the ith path. The implementation code of the second sample function can be represented as at least part of AST paths indicated as $\{x'_1, \ldots, x'_j\}$ over an AST of the second sample function and a label indicating there is no fault in the implementation code of the second sample function, wherein each AST path can be represented as $x'_j = v_1^j v_2^j \ldots v_{l_j}^j$ and $l_j$ is the length of the jth path. The at least part of AST paths over the AST of the first sample function and the at least part of AST paths over the AST of the second sample function include one or more code differences between the parent commit and the child commit.

According to embodiments, classifier 402 can be constructed based on at least part of the plurality of sets of AST paths for implementation code of the plurality of sample functions and corresponding labels indicating whether there is at least one fault in the implementation code of the plurality of sample functions. During construction of classifier 402, the plurality of sets of AST paths for the implementation code of the plurality of sample functions can be encoded to generate vector representations for the plurality of sets of AST paths. Classifier 402 is trained based on the vector representations for the plurality of sets of AST paths for the implementation code of the plurality of sample functions and corresponding labels of the plurality of sample functions.

According to embodiments, classifier 402 includes path encoder 4021 and classification module 4022 as shown in FIG. 7. Path encoder 4021 can encode training samples for classification module 4022 based on a plurality of sets of AST paths for the implementation code of the plurality of sample functions. Each training sample can be encoded as vector representations of a set of AST paths for implementation code of each sample function. Given a set of AST paths $\{x_1, \ldots, x_i\}$, path encoder 4021 can create a sequence of continuous vector representations $z = \{z_1, \ldots, z_i\}$ for the set of AST paths, wherein a representation vector z is mapped to each path $x_i = v_1^i v_2^i \ldots v_{l_i}^i$.

According to embodiments, path encoder 4021 can be built up using bi-directional Long Short Term Memory Networks (LMTS). The bi-directional LSTM can be used to encode the plurality of sets of AST paths for the implementation code of the plurality of sample functions. Each AST path is composed of nodes and their child indices from a limited vocabulary of symbols for specified program langrage. Each node is represented using a learned embedding matrix $E^{nodes}$ and then the entire nodes of the set of AST paths can be encoded using the final states of a bi-directional LSTM:

$$\{h_1, \ldots, h_l\} = \text{LSTM}(E_{v_1}^{nodes}, \ldots, E_{v_l}^{nodes}) \quad (1)$$

$$\text{encode\_path}(v_1 \ldots v_l) = [h_l^{\rightarrow}; l_i^{\leftarrow}] \quad (2)$$

$$z = \tanh(W_{in}[\text{encode\_path}(v_1 \ldots v_l)]) \quad (3)$$

Where $\{h_1, \ldots, h_l\}$ indicates output vectors that a bi-directional LSTM layer produces, $\text{encode\_path}(v_1 \ldots v_l)$ represents encoded path metrics. $W_{in}$ is a $2d_{path} \times d_{hidden}$ weight matrix which needs to be learned during training, $d_{path}$ represents a length of a path, and $d_{hidden}$ represents the number of hidden units, and z represents a sequence of vector representations for the set of AST paths.

According to embodiments, path encoder 4021 can be implemented with an attention-based encoder, for example, an attention-based bi-directional LMTS below.

$$a = \text{softmax}(w^T \bar{h}) \quad (4)$$

$$z = \tanh(\bar{h}a^l) \quad (5)$$

Where $\bar{h}$ is a matrix consisting of output vectors $\{h_1, \ldots, h_l\}$ that the bi-directional LSTM layer produces, softmax( ) represents an activation function, a represents results of the activation function softmax ( ), l is a length of a path, w is a trained parameter vector and $w^T$ is a transpose of the trained parameter vector, tanh( ) indicates an activation function, z represents a sequence of vector representations for the set of AST paths.

It would be appreciated that either the bi-directional LMTS or the attention-based bi-directional LMTS is merely an example and any other algorithms currently known or to be developed in the future can be applied. The scope of the present disclosure described herein is not limited in this aspect.

According to embodiments, classification module 4022 can be constructed based on training samples from path encoder 4021 and corresponding labels indicating whether there is at least one fault in corresponding sample functions.

According to embodiments, if a label indicates that there is at least one fault in a sample function, the label may further include a fault category of the at least one fault.

Classification module 4022 can be constructed in a variety of ways including but not limited to a neural network model (NNM), Mathematical relationship model, linear model, non-linear model etc. Taking the neutral network model as an example, the neutral network model usually includes an input layer, an output layer and one or more hidden layers between the input and output layers. Each of the layers are interconnected by modifiable weights, which are represented by links between layers. Each layer consists of a number of units (neurons) that loosely mimic the properties of biological neurons. The hidden layers are mappings from one space to another. The goal is to map to a space where the problem is linearly separable. The input layer may for example take a multi-dimensional vector as inputs. The output of each input unit equals the corresponding component in the vector. Each unit of the hidden layer computes the weighted sum of its inputs in order to form a scalar net activation (net) which is the inner product of the inputs with the weights at the hidden layer. The output of an output unit can be achieved by an activation function as below.

$$O_i = \varphi(h_i) = \varphi\left(\sum_{j=1}^{l} w_{ij} H_j\right) = \varphi\left(\sum_{j=1}^{l} w_{ij} \varphi\left(\sum_{k=1}^{m} w_{jk} I_k\right)\right) \quad (6)$$

Where:
k indexes units in the input layer,
j indexes units in the hidden layer,
i indexes units in the output layer,
l denotes the number of hidden units,
$w_{ij}$ denotes a weight of connection between output unit i and hidden unit j,
$w_{jk}$ denotes a weight of connection between hidden unit j and input unit k,
$y_j$ represents an output of hidden unit j,
$\varphi(\cdot)$ represents an activation function,
Oi represents an output of output unit i,
$I_k$ represents an input of input unit k,
c denotes the number of classes.

According to embodiments, training samples comprising vector representations for implementation code of sample functions can be used as input training data of classification module 4022. Labels of the sample functions indicating whether there is at least one fault in corresponding sample functions can be used as output training data of classification module 4022. Classification module 4022 is built up to provide classification results for one or more functions based on vector representations of the implementation code of the one or more functions included in the source code. The source code can be preprocessed as vector representations of the implementation code of one or more functions included in the source code to fit as inputs of the classification module 4022. Classification module 4022 can output the classification results for the one or more functions each indicating a probability of having at least one fault in the one or more functions. According to one embodiment, the classification results for the one or more functions may indicate possibilities for different fault categories in the one or more functions.

Going back to FIG. 5, at S510, classifier 402 can generate a fault detection result of the source code based on the classification results for the one or more functions. According to embodiments, each of the classification results for one or more functions is indicated by a confidence value which is determined by classification module 4022 based on a probability of having at least one fault in the function. It can be determined whether there is at least one fault in the one or more functions by comparing each of the classification results with a confidence threshold. The confidence threshold can be set according to expertise knowledge. According to embodiments, if at least one confidence value of the one or more functions is greater than the confidence threshold, the fault detection result of the source code indicates there is at least one fault in the source code. If all confidence values of the one or more functions are less than or equal to the confidence threshold, then responsive to this condition, the fault detection result of the source code indicates there is no fault in the source code.

The embodiments of the present disclosure can provide static fault analysis and detection for source code in a more cost-effective way with less false positives.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wire transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for fault detection, comprising:
   identifying, by one or more processors, implementation code of one or more functions from source code;
   converting, by one or more processors, the implementation code of the one or more functions to corresponding Abstract Syntax Trees (ASTs);
   representing, by one or more processors, the implementation code of the one or more functions as a first plurality of sets of AST paths over the ASTs;
   generating, by one or more processors, classification results for the one or more functions with a classifier based on the first plurality of sets of AST paths for the implementation code of the one or more functions, each of the classification results indicating a probability of having at least one fault in a corresponding function of the one or more functions, wherein (i) the classifier is constructed based on at least part of a second plurality of sets of AST paths for implementation code of a plurality of sample functions and corresponding labels of a plurality of sample functions and (ii) implementation code of the plurality of sample functions includes implementation code of the plurality of sample function pairs each including implementation code of a first sample function from a parent commit with at least one fault and implementation code of a second sample function from a child commit with the at least one fault fixed; and
   generating, by one or more processors, a fault detection result of the source code based on the classification results.

2. The method of claim 1, wherein the classifier provides a mapping between a set of AST paths for implementation code of a function and a classification result indicating a probability of having at least one fault in the function.

3. The method of claim 1, wherein each label indicates whether there is at least one fault in a corresponding sample function of the plurality of sample functions.

4. The method of claim 1, wherein the parent commit and the child commit are identified from a fault code store.

5. The method of claim 1, wherein the implementation code of each of the plurality of sample function pairs is obtained by:
  identifying, by one or more processors, one or more code differences between the parent commit and the child commit; and
  retrieving, by one or more processors, the implementation code of the first sample function from the parent commit and the implementation code of the second sample function from the child commit according to the one or more code differences.

6. The method of claim 1, wherein the classifier is constructed by:
  converting, by one or more processors, the implementation code of the plurality of sample functions to a plurality of ASTs;
  representing, by one or more processors, the implementation code of the plurality of sample functions as the at least part of the second plurality of sets of AST paths over the plurality of ASTs, wherein the at least part of the second plurality of sets of AST paths includes code differences between the parent commit and the child commit in each of the plurality of sample function pairs;
  generating, by one or more processors, vector representations for the at least part of the second plurality of sets of AST paths for the implementation code of the plurality of sample functions; and
  training, by one or more processors, the classifier based on the vector representations for the at least part of the second plurality of sets of AST paths for the implementation code of the plurality of sample functions and corresponding labels of the plurality of sample functions.

7. The method of claim 6, wherein the generated vector representations for the at least part of the second plurality of sets of AST paths for the implementation code of the plurality of sample functions is implemented using an attention-based bi-directional Long short-term memory (LSTM).

8. The method of claim 1, wherein generating classification results for the one or more functions comprises:
  converting, by one or more processors, the first plurality of sets of AST paths for the implementation code of the one or more functions to vector representations; and
  generating, by one or more processors, the classification results for the one or more functions with the classifier based on the converted vector representations.

9. The method of claim 1, wherein generating the fault detection result of the source code comprises:
  responsive to at least one confidence value indicating classification results for the one or more functions being greater than a confidence threshold, generating, by one or more processors, the fault detection result of the source code to indicate there is at least one fault in the source code.

10. A computer-implemented system for fault detection, comprising:
  one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    identifying implementation code of one or more functions from source code;
    converting the implementation code of the one or more functions to corresponding Abstract Syntax Trees (ASTs);
    representing the implementation code of the one or more functions as a first plurality of sets of AST paths over the ASTs;
    generating classification results for the one or more functions with a classifier based on the first plurality of sets of AST paths for the implementation code of the one or more functions, each of the classification results indicating a probability of having at least one fault in a corresponding function of the one or more functions, wherein (i) the classifier is constructed based on at least part of a second plurality of sets of AST paths for implementation code of a plurality of sample functions and corresponding labels of a plurality of sample functions and (ii) implementation code of the plurality of sample functions includes implementation code of the plurality of sample function pairs each including implementation code of a first sample function from a parent commit with at least one fault and implementation code of a second sample function from a child commit with the at least one fault fixed; and
    generating a fault detection result of the source code based on the classification results.

11. The system of claim 10, wherein the classifier provides a mapping between a set of AST paths for implementation code of a function and a classification result indicating a probability of having at least one fault in the function.

12. The system of claim 10, wherein each label indicates whether there is at least one fault in a corresponding sample function of the plurality of sample functions.

13. The system of claim 10, wherein the parent commit and the child commit are identified from a fault code store.

14. The system of claim 10, wherein the implementation code of each of the plurality of sample function pairs is obtained by:
  identifying one or more code differences between the parent commit and the child commit; and
  retrieving the implementation code of the first sample function from the parent commit and the implementation code of the second sample function from the child commit according to the one or more code differences.

15. The system of claim 10, wherein the classifier is constructed by:
  converting the implementation code of the plurality of sample functions to a plurality of ASTs;
  representing the implementation code of the plurality of sample functions as the at least part of the second plurality of sets of AST paths over the plurality of ASTs, the at least part of the second plurality of sets of AST paths including code differences between the parent commit and the child commit in each of the plurality of sample function pairs;
  generating vector representations for the at least part of the second plurality of sets of AST paths for the implementation code of the plurality of sample functions; and
  training the classifier based on the vector representations for the at least part of the second plurality of sets of AST paths for the implementation code of the plurality of sample functions and corresponding labels of the plurality of sample functions.

16. The system of claim 10, wherein generating classification results for the one or more functions comprises:
converting the first plurality of sets of AST paths of the implementation code for the one or more functions to vector representations; and
generating, by one or more processors, the classification results for the one or more functions with the classifier based on the converted vector representations.

17. The system of claim 10, wherein generating the fault detection result of the source code comprises:
responsive to at least one confidence value indicating classification results for the one or more functions being greater than a confidence threshold, generating the fault detection result of the source code to indicate there is at least one fault in the source code.

18. A computer program product comprising one or more computer-readable tangible storage media and program instructions stored on at least one of the one or more computer-readable tangible storage media, the program instructions executable by a processor to cause the processor to perform a method comprising:
converting implementation source code of one or more functions to corresponding Abstract Syntax Trees (ASTs);
representing the implementation code of the one or more functions as a plurality of sets of AST paths over the ASTs;
generating classification results for the one or more functions with a classifier based on the plurality of sets of AST paths for the implementation code of the one or more functions, each of the classification results indicating a probability of having at least one fault in a corresponding function of the one or more functions, wherein (i) the classifier is constructed based on at least part of a second plurality of sets of AST paths for implementation code of a plurality of sample functions and corresponding labels of a plurality of sample functions and (ii) implementation code of the plurality of sample functions includes implementation code of the plurality of sample function pairs each including implementation code of a first sample function from a parent commit with at least one fault and implementation code of a second sample function from a child commit with the at least one fault fixed; and
generating a fault detection result of the source code based on the classification results.

19. The computer program product of claim 18, wherein generating classification results for the one or more functions includes:
converting the first plurality of sets of AST paths for the implementation code of the one or more functions to vector representations; and
generating the classification results for the one or more functions with the classifier based on the converted vector representations.

20. The computer program product of claim 18, wherein generating the fault detection result of the source code includes:
responsive to at least one confidence value indicating classification results for the one or more functions being greater than a confidence threshold, generating the fault detection result of the source code to indicate there is at least one fault in the source code.

* * * * *